(12) United States Patent
Suga

(10) Patent No.: US 8,605,347 B2
(45) Date of Patent: Dec. 10, 2013

(54) IMAGE READING APPARATUS WITH SHADING CORRECTION

(75) Inventor: Junya Suga, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 13/032,417

(22) Filed: Feb. 22, 2011

(65) Prior Publication Data

US 2011/0205605 A1 Aug. 25, 2011

(30) Foreign Application Priority Data

Feb. 25, 2010 (JP) ................................. 2010-040471

(51) Int. Cl.
*H04N 1/46* (2006.01)
(52) U.S. Cl.
USPC ........................................................ 358/513
(58) Field of Classification Search
None
See application file for complete search history.

(56) References Cited

U.S. PATENT DOCUMENTS

| 6,700,683 B1* | 3/2004 | Hashizume | 358/461 |
| 7,236,270 B2* | 6/2007 | Okamura | 358/461 |
| 2004/0017589 A1* | 1/2004 | Wang | 358/461 |

FOREIGN PATENT DOCUMENTS

JP 10-341342 12/1998

* cited by examiner

*Primary Examiner* — Jeremiah Bryar

(57) ABSTRACT

An image reading apparatus which performs shading correction using black reference data, wherein in the process of obtaining the black reference data, the image reading apparatus includes a reading control section that outputs a shift pulse which is the start timing of charge accumulation corresponding to each RGB color and controls the process of lighting of the light source of a predetermined color for a predetermined period after a predetermined period having elapsed since the output of each shift pulse, and a data processing section that does not obtain the data output from the image sensor as the black reference data according to the shift pulse and obtains the data output from the image sensor as the black reference data during a period that at least overlaps with the lighting period.

4 Claims, 3 Drawing Sheets

IMAGE READING APPARATUS WITH SHADING CORRECTION

INCORPORATED BY REFERENCE

The entire disclosure of Japanese Patent Application No. 2010-040471, filed Feb. 25, 2010, is expressly incorporated by reference herein.

BACKGROUND

1. Technical Field

The present invention relates to image reading technology.

2. Related Art

There is an image reading apparatus such as a scanner apparatus that performs shading correction to prevent unevenness of the read image due to inhomogeneous brightness of the light source lamp, non-uniform sensitivity of the image reading device, or the like. Such an image reading apparatus, for example, before reading a document, scans a white reference surface and a black reference surface to obtain white reference data and black reference data to be used for shading correction (for example, JP-A-10-341342). The image reading apparatus produces a predetermined correction formula for each image reading device using the obtained white and black reference data. Next, the image reading apparatus performs shading correction to the read data of a document according to the correction formula.

By the way, there is an image reading apparatus performing shading correction that obtains the black reference data in a state where the light source lamp is turned off.

However, even an image reading apparatus which obtains the black reference data in a state where the light source is turned off, the light source is turned on when a document is actually read. When the light source is lit, noise is generated by a current, and crosstalk may occur in the output of the image reading device. Then streaky noise may appear in the read image data.

SUMMARY

An advantage of some aspects of the invention is to minimize degradation of the image quality caused by crosstalk due to lighting of the light source as much as possible.

According to a first aspect of the invention, there is provided an image reading apparatus which performs shading correction using black reference data, including light sources of each RGB color, an image sensor that transfers charge accumulated in a photoelectric conversion device to a shift register using shift pulses and outputs the charge transferred to the shift register as analog data, an A/D converter section which performs A/D conversion of the analog data output from the image sensor and outputs it as digital data, a reading control section that controls turning-on and turning-off of the light sources and controls outputting of the shift pulses, and a data processing section that processes the digital data output from the A/D converter section. In obtaining the black reference data, the reading control section outputs a shift pulse which is the start timing of charge accumulation corresponding to each RGB color and has a lighting period where the light source of a predetermined color is lit after a predetermined period has elapsed since the output of each shift pulse, and the data processing section does not obtain the data output from the image sensor as the black reference data based on the shift pulse, but obtains the data output from the image sensor as the black reference data during a period that at least overlaps with the lighting period.

Here, in the image reading apparatus, the lighting period may be later than the period when data is output from the image sensor based on the shift pulse.

According to a second aspect of the invention, there is provided an image reading apparatus which performs shading correction using black reference data including light sources of each RGB color, an image sensor that transfers charge accumulated in a photoelectric conversion device to a shift register using shift pulses and outputs the charge transferred to the shift register as analog data, an A/D converter section which performs A/D conversion of the analog data output from the image sensor and outputs it as digital data, a reading control section that controls turning-on and turning-off of the light sources and controls outputting of the shift pulses, and a data processing section that processes the digital data output from the A/D converter section. In obtaining the black reference data, the reading control section outputs a shift pulse which is the start timing of charge accumulation corresponding to each RGB color and has a lighting period where the light source of a predetermined color is lit after a predetermined period has elapsed since the output of every second shift pulse, and the data processing section obtains the data output from the image sensor as the black reference data based on the every second shift pulse and does not obtain the data output from the image sensor as the black reference data based on any shift pulses other than the every second shift pulse.

Here, in the image reading apparatus, the lighting period at least overlaps with the period when data is output from the image sensor.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the first embodiment of the invention will be described with reference to the drawings.

Figure 1:
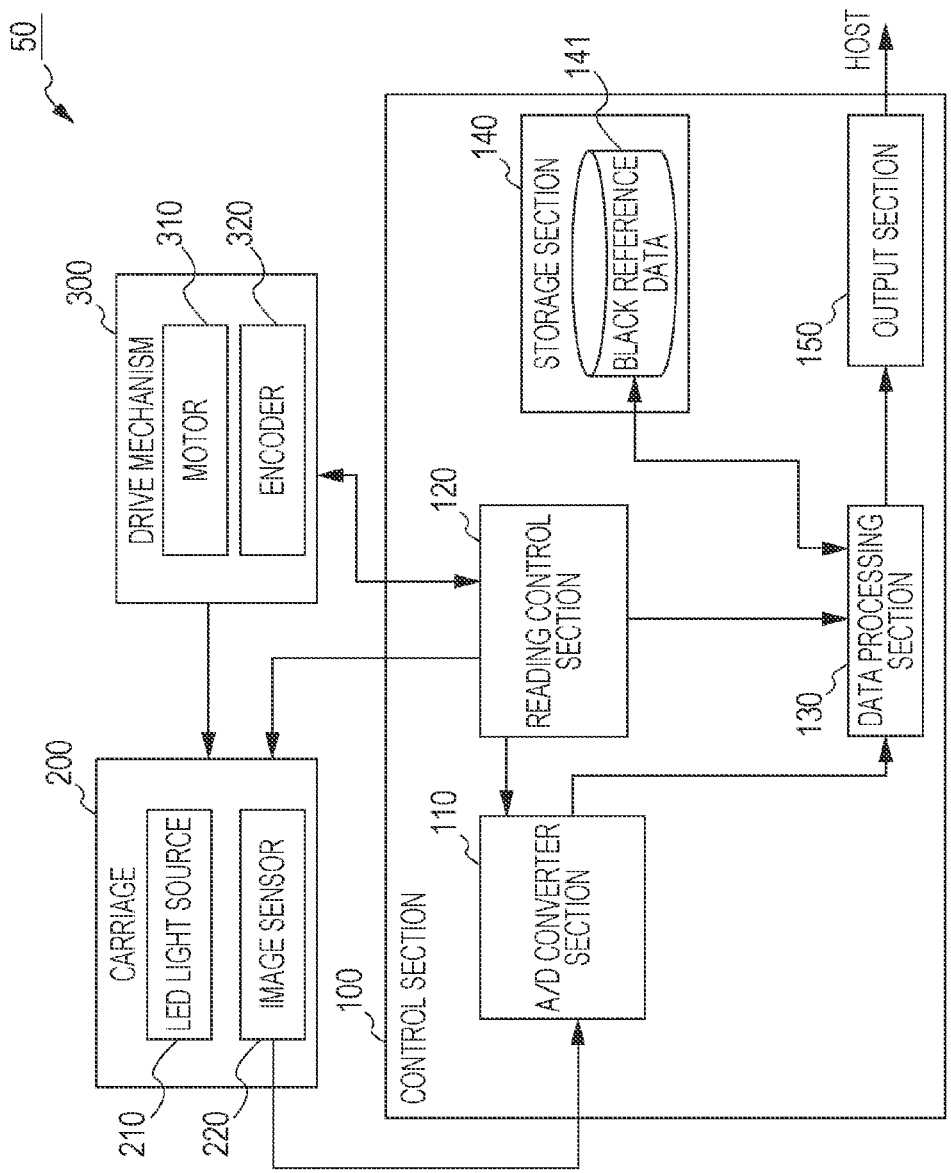
FIG. 1 is a block diagram illustrating an example of the configuration of the image reading apparatus according to the first embodiment of the invention.

FIG. 1 is a block diagram illustrating an example of the configuration of the image reading apparatus 50 according to the first embodiment of the invention.

An image reading apparatus 50 is a so-called flatbed-typed image reading apparatus which is provided with a platen (not illustrated) on the upper surface of the housing. The image reading apparatus 50 reads the image of a document placed on the transparent platen using an image sensor 220.

The image reading apparatus 50 has a mechanism for generating white reference data to be used for the shading correction. In this embodiment, the image reading apparatus 50, for example, is provided with a white reference plate (not illustrated) which is a highly reflective and uniform reflecting surface on the upper surface of the housing. The image reading apparatus 50 lights (turns on) an LED light source 210 and reads the white reference plate using the image sensor 220.

The details will be described later, but when generating black reference data by turning off the LED light source 210 during a first predetermined period and turning on the LED light source 210 during a second predetermined period, the image reading apparatus 50 reads and discards the charge accumulated in the photoelectric conversion device (photodiode) of the image sensor 220. Meanwhile, after having read and discarded the charge accumulated in the photoelectric conversion device as described above, the image reading apparatus 50 reads the charge output from the shift register of the image sensor 220 during the period that overlaps at least with the second predetermined period, and uses it as the black reference data. The image reading apparatus 50 is not provided with a black reference surface (black reference plate).

As shown in the diagram, the image reading apparatus 50 includes a carriage 200 mounted with the LED light source 210 and the image sensor 220, a drive mechanism 300 for controlling the movement of the carriage 200, and a control section 100 that controls the whole of the image reading apparatus 50 and performs various processing for reading the image.

The carriage 200 transports the image sensor 220 with the LED light source 210 in the sub-scanning direction. The carriage 200 is mounted so as to be able to slide on the guide shafts and the like which are parallel to the surface of the platen, and is driven by the belt rotated by a motor 310 (for example, a DC motor) of the drive mechanism 300. The amount of movement of the carriage 200 is controlled based on the output value of an encoder 320 that outputs encoder pulses according to the amount of rotation of the motor 310 of the drive mechanism 300.

The LED light source 210 consists of red (R) LED, green (G) LED and blue (B) LED, and generates the three RGB colors of light in a predetermined sequence. In this embodiment, in the case of reading a 1-line amount of a normal document or the white reference plate, the LED light source 210 generates light in sequence of red LED, green LED and blue LED. Then, to read an amount corresponding to the number of lines needed to generate the image data of a document or the white reference data, the same lighting sequence is repeated. The period of lighting of each color LED has been determined beforehand for each color and the light is turned off after the predetermined period has elapsed since the light was turned on. Here, the lighting sequence for reading a 1-line amount is not limited to RGB order.

The image sensor 220 receives the light reflecting from the document, accumulates charge according to the amount of light received, and then sends it as image read data (electrical signals) to the control section 100.

The image sensor 220 consists of multiple sensor chips arranged along the main scanning direction. Each sensor chip has a structure that is similar to a normal CCD (Charge Coupled Device) image sensor. In other words, each sensor chip is provided with photoelectric conversion devices (photodiode), shift gates and shift registers. Then, the charge accumulated in the photoelectric conversion device is transferred to the shift register with the shift gate open, and the charge is output by moving them sequentially using the shift register.

The opening of the shift gate (charge transfer) is performed in response to the application of the shift pulse (a signal from the reading control section 120 to be described later). As the photoelectric conversion device accumulates charge at all times according to the amount of light received, the timing of the charge transfer to the shift register is the start timing of charge accumulation for the lighting of the next color of light.

The charge transferred to the shift register is converted to an electric signal (analog data) by the output section at the end of the shift register, and is sent to an A/D converter section 110.

The output of the charge stored in the shift register is performed in response to the predetermined read-out clock (a signal from the reading control section 120 to be described later). For example, the charge of 1 pixel is output as analog data in every clock cycle. Thus, after the charge of an amount corresponding to 1 line is transferred from the photoelectric conversion device to the shift register by a certain shift pulse, even after the output of the A/D converter section 110 is finished, the charge being stored in the shift register (for example, charge accumulated due to noise and the like) can be output in response to the read-out clock.

The control section 100 is provided with the A/D converter section 110 that converts analog data output from the image sensor 220 into digital data, a data processing section 130 that performs various corrections for the digital data output from the A/D converter section 110, a storage section 140 that stores the digital data for the various correction processes of the data processing section 130, an output section 150 that sends the data from the data processing section 130 to the host such as a personal computer and the like, and the reading control section 120 that performs the overall control of each functional section in the control section 100, as well as the control of the LED light source 210 or the image sensor 220 in the carriage 200, and the drive mechanism 300.

The reading control section 120 controls movement of the carriage 200 by controlling the rotation of the motor 310 of the drive mechanism 300.

The reading control section 120 also controls image reading, reading of the white reference data, and reading of the black reference data of the image sensor 220.

More specifically, the reading control section 120 supplies the shift pulses to the image sensor 220 and controls the transfer timing of the charge accumulated in the photoelectric conversion device to the shift register (the start timing of the next charge accumulation). The reading control section 120 supplies the read-out clock for the image sensor 220 and controls output of the charge that is stored in the shift register to the A/D converter section 110.

In addition, the reading control section 120 controls turning-on and turning-off of the LED light source 210 according to the reading operation of the image sensor 220.

The shift pulses and the read-out clock, for example, may be generated by the timing generator which generates various signals based on the reference clock output from the reading control section 120. The timing generator, for example, may be provided in the carriage 200. Of course, it may be also provided in the control section 100.

The data processing section 130 performs various corrections such as shading correction and the like on the digital data output from the A/D converter section 110 and outputs it to the output section 150. For example, in the case of shading correction, the data processing section 130 stores the image data output from the A/D converter section 110, white reference data, and black reference data each in the storage section 140 described below, and performs shading correction to the corresponding pixel in accordance with a predetermined correction formula. After the correction, the data processing section 130 outputs the corrected image data to the output section 150.

The storage section 140 stores the data for the data processing section 130 to perform various correction processes. Specifically, the storage section 140 has a black reference data DB (database) 141 storing the black reference data. The storage section 140 may be configured to have an image data DB that has the image data before correction or a white reference data DB that has the white reference data (neither is illustrated) or the like.

The output section 150 is provided with interfaces for performing network connection or USB connection and sends the digital data output from the data processing section 130 to the host computer.

The main components of the control section 100 can be achieved by a general computer that is provided with a CPU which is an arithmetic processor, a ROM storing programs and the like, a RAM as a main memory storing temporary data and the like, interfaces that control input and output of the host and the like, and a system bus which functions as communication paths between each component. The main components may be configured by an ASIC (Application Specific Integrated Circuit), including a specially designed ASIC to perform specific processing. The A/D converter section 110 may be configured as an analog front end IC (Integrated Circuit).

The image reading apparatus 50 according to this embodiment is configured as described above. However, this configuration only describes main components with the purpose of describing the features of the invention, which is in no way limited to the above configuration. Further, other configurations that are equipped with in the general image reading apparatus are not excluded. The image reading apparatus 50 may be a multi-function machine having a printing function or a facsimile function. In addition, the A/D converter section 110 may be mounted even on the substrate in the carriage 200.

In addition, in order to facilitate understanding of the configuration of the image reading apparatus 50, each component described above was categorized according to its main processing content. Neither the method of categorization nor the naming of components restricts the invention. The configuration of the image reading apparatus can be divided into more components depending on the processing content. It can also be categorized so that a single component may perform even more processing. The processing of each component may be run on one hardware or on multiple hardwares.

Hereafter, there is provided a description about the reading control of the black reference data which is performed in the reading control section 120 of this embodiment.

Figure 2:
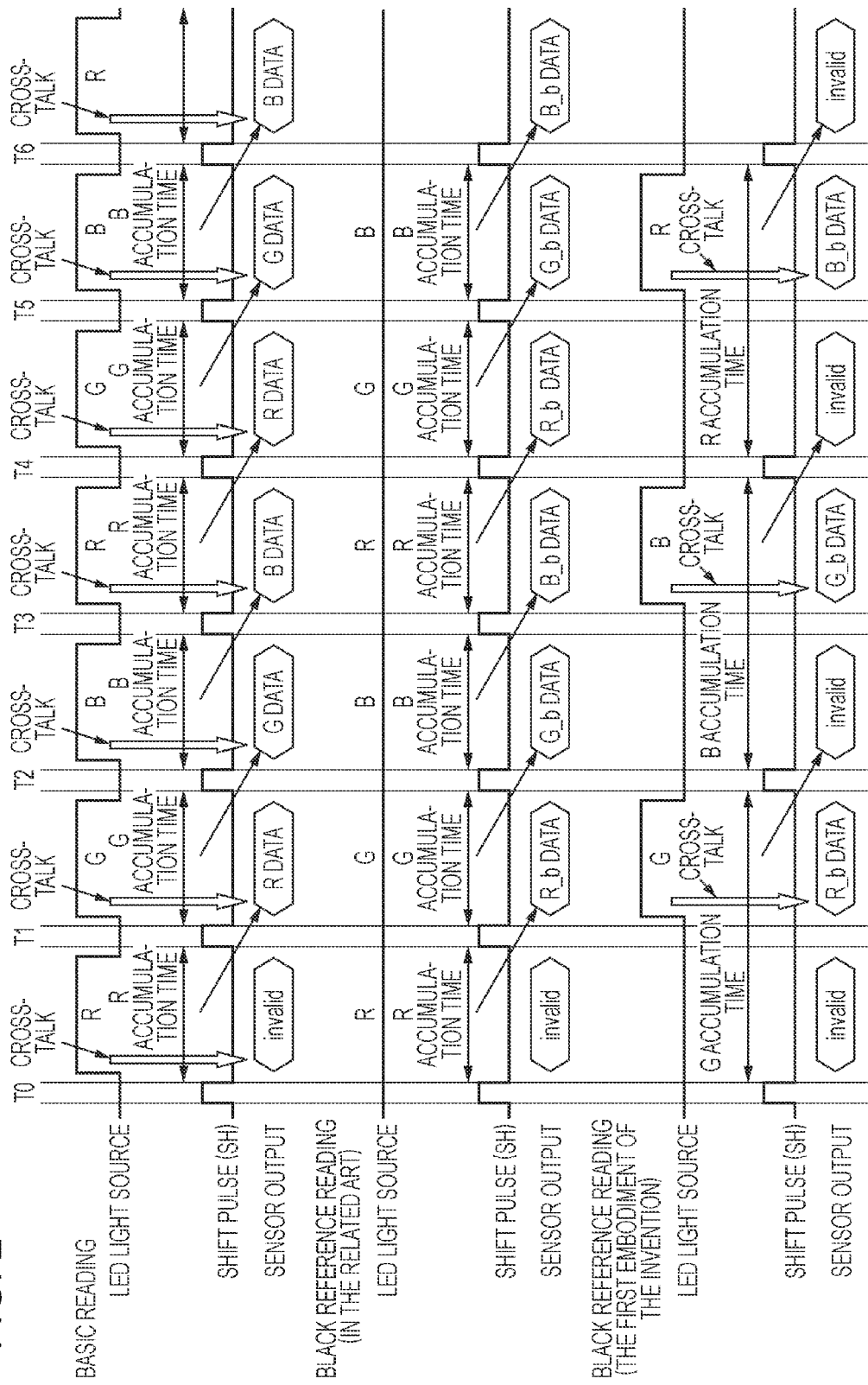
FIG. 2 is a timing chart illustrating an example of the reading control of the black reference data according to the first embodiment of the invention.

FIG. 2 is a timing chart illustrating an example of the reading control of the black reference data of the first embodiment. In addition, the timings of turning-on of the LED light source, the shift pulse output, and the sensor output are not intended to be limited to the intervals shown in the diagram.

First, for the sake of convenience of explanation of the black reference data reading control in this embodiment, the control of basic reading (reading of a normal document) will be described.

When the reading control section 120 starts the basic reading, it sequentially outputs the shift pulse which is the start timing of charge accumulation corresponding to red (R), green (G), and blue (B) to the image sensor 220 (T0, T1, T2, T3, T4, T5, T6, . . . ). Each shift pulse indicates the timing of charge transfer to the shift register, which had been accumulated in the photoelectric conversion device by the shift pulse which is corresponding to the previous color.

When the reading control section 120 starts the basic reading, it also outputs the read-out clock to the image sensor 220 (not illustrated). The charge of each RGB color, which was transferred to the shift register according to each shift pulse, is sequentially output as analog electric signal to the A/D converter section 110 by the read-out clock (R data, G data, B data). Furthermore, the analog data, that is transferred to the shift register at the start timing of the reading (T0) and then (interval of T0 to T1) is output to the A/D converter section 110, can be read and discarded as invalid data (invalid) by the data processing section 130. The A/D converter section 110 may be assigned so as to read and discard.

In addition, the reading control section 120 turns on and turns off the LED light source 210 in accordance with the output timing of each shift pulse. In the illustrated example, according to the output timing (T0, T3, T6, . . . ) of the shift pulse which is the start timing of charge accumulation corresponding to red (R) (simultaneously with the shift pulse or after a predetermined period has elapsed since the shift pulse), the reading control section 120 turns on the red LED, continues lighting it for a predetermined period, and then turns it off. Similarly, according to the output timing of the shift pulse which is the start timing of charge accumulation corresponding to green (G) or blue (B) (simultaneously with the shift pulse or after a predetermined period has elapsed since the shift pulse), the reading control section 120 turns on the green LED (G) or the blue LED (B), continues lighting it for a predetermined period, and then turns it off.

The lighting period of each color LED depends on the color. Because there are differences and variations among colors with regard to the brightness of three-color light source and the sensitivity of the sensor, even if the period of continuous lighting is the same, the amount of charge output from the photoelectric conversion for each color is not equal. Thus, depending on the brightness of the three-color light source and the sensitivity of the sensor, the lighting periods are preset to be different.

Subsequently, for the sake of convenience of explanation of the reading control of the black reference data in this embodiment, the control of the black reference reading in the related art will be described.

The outputting of shift pulse and the read-out clock are the same as the basic reading. On the other hand, the LED light source of each RGB color is not turned on. In other words, in the state where the LED light source is turned off, the charge corresponding to each RGB color is accumulated in the photoelectric conversion device, is transferred to the shift register at the timing of each shift pulse and then is sequentially output to the A/D converter section 110 as the black reference data of red (R) (R_b data), the black reference data of green (G) (G_b data), and the black reference data of blue (B) (B_b data).

Incidentally, in the basic reading described above, the period when the charge is being stored in the shift register of the image sensor 220 and is sequentially output to the A/D converter section 110 overlaps with the period of lighting of the LED light source 210. Here, the current which turns on the LED light source 210 may generate noise. In this case, the noise generated due to lighting of the LED light source 210 may generate crosstalk to the charge being stored in the shift register or the electrical signal output from the shift register.

In the example of this figure, in the R data output from the shift register, crosstalk due to lighting of the G color of the LED light source 210 (T1 to T2, T4 to T5, . . . ), in the G data output from the shift register, crosstalk due to lighting of the B color of the LED light source 210 (T2 to T3, T5 to T6, . . . ), and in the B data output from the shift register, crosstalk (T3 to T4, . . . ) due to lighting of the R color of the LED light source 210 may occur.

However, in the black reference reading in the related art described above, the effect of crosstalk which occurs during the period when the charge being stored in the shift register is output due to the lighting of the LED light source is not reflected in the black reference data. As a result, the shading correction using the black reference data in the related art does not provide an adequate correction of the image data (the crosstalk noise caused due to the lighting of the LED light source is not corrected), and streaky noise may occur.

Therefore, in this embodiment, in the reading of a black reference, the charge accumulated in the photoelectric conversion device is not used as black reference data, but the electrical signal output from the shift register during the period that overlaps with the lighting period of the LED light source 210 is obtained and used as black reference data. The following describes the reading control of a black reference in this embodiment.

When the reading control section 120 starts reading the black reference, it outputs the shift pulse which is the start timing of charge accumulation corresponding to green, blue and red, at an interval twice that of the basic reading control, sequentially to the image sensor 220 (T0, T2, T4, T6, . . . ). Each shift pulse indicates the timing of charge transfer to the shift register, in which the charge was accumulated in the photoelectric conversion device by the shift pulse corresponding to the previous color.

In addition, when the reading control section 120 starts reading the black reference, it outputs the read-out clock to the image sensor 220 (not illustrated). The charge of each color of RGB transferred to the shift register according to each shift pulse is sequentially output as an analog electric signal to the A/D converter section 110 by the read-out clock.

Here, the 1-line amount of data, which was transferred to the shift register at the timing of each shift pulse (T0, T2, T4, T6, . . . ) and then (interval of T0 to T1, T2 to T3, T4 to T5, T6 to T7, . . . ) was output to the A/D converter section 110, can be read and discarded as invalid data (invalid) by the data processing section 130. The A/D converter section 110 may be assigned so as to read and discard.

After the 1-line amount of data is transferred to the shift register at the timing of each shift pulse (T0, T2, T4, T6, . . . ) and is output to the A/D converter section 110, the reading control section 120 continues the read-out clock. Next, the charge which is being stored in the shift register is sequentially output to the A/D converter section 110 as an analog electric signal (interval of T1 to T2, T3 to T4, T5 to T6, . . . ). The data processing section 130 obtains the 1-line amount of data of each RGB color, which is output at the timing, as the black reference data of red (R) (R_b data), the black reference data of green (G) (G_b data), and the black reference data of blue (B) (B_b data).

In addition, according to the timing (simultaneously with the timing or after a predetermined period has elapsed since the timing) with a predetermined period (at least the period required for outputting the 1-line amount of the charge to the A/D converter section 110) having elapsed since the output of each shift pulse (T1, T3, T5, . . . ), the reading control section 120 turns on the LED light source 210, continues lighting it for a predetermined period (at least the period required for accumulating the 1-line amount of the charge in the photoelectric conversion device), and then turns it off.

In the illustrated example, according to the output timing (simultaneously with the timing or after a predetermined period has elapsed since the timing) with a predetermined period having elapsed since the shift pulse which is the start timing of charge accumulation corresponding to the green (G) (T1, T7, . . . ), the reading control section 120 turns on the green LED, continues lighting it for a predetermined period, and then turns it off. Similarly, according to the output timing (simultaneously with the timing or after a predetermined period has elapsed since the timing) with a predetermined period having elapsed since the shift pulse which is the start timing of charge accumulation corresponding to the blue (B) (T3, T9, . . . ), the reading control section 120 turns on the blue LED, continues lighting it for a predetermined period, and then turns it off. In the same way, according to the output timing (simultaneously with the timing or after a predetermined period has elapsed since the timing) with a predetermined period having elapsed since the shift pulse which is the start timing of charge accumulation corresponding to the red (R) (T5, T11, . . . ), the reading control section 120 turns on the red LED, continues lighting it for a predetermined period, and then turns it off.

The above is the reading control of the black reference in the first embodiment. According to this reading control of the black reference, after the completion of output of the charge accumulated in the photoelectric conversion device to the A/D converter section 110, the electric signal from the shift register can be output to the A/D converter section 110 while the LED light source 210 is turned on. Next, the electrical signal, in which the influence of crosstalk in regard to the output of the shift register due to the lighting of the LED light source 210 is reflected, can be obtained as black reference data.

Moreover, compared to the variation in the output of each image reading device which is obtained based on the charge accumulated in the photoelectric conversion device in the state where the LED light source is turned off as in the related art, there is larger variation in the output of each image reading device which is obtained based on the charge output from the shift register which is carrying the crosstalk due to the lighting of the LED light source. Therefore, according to this embodiment, it is possible to obtain more accurate black reference data. As a result, the output variation, which is caused by the crosstalk which is carried to the output of the image reading device, can be effectively cancelled by the shading correction and the image quality can be improved.

In the above, the first embodiment of the invention has been described. According to this embodiment, it is possible to prevent degradation of image quality due to the crosstalk caused by the lighting of the light source as much as possible.

Hereinafter, the second embodiment of the invention will be described with reference to drawings. This embodiment is different from the first embodiment in the way the black reference reading is controlled. The following describes mainly the differences.

Figure 3:
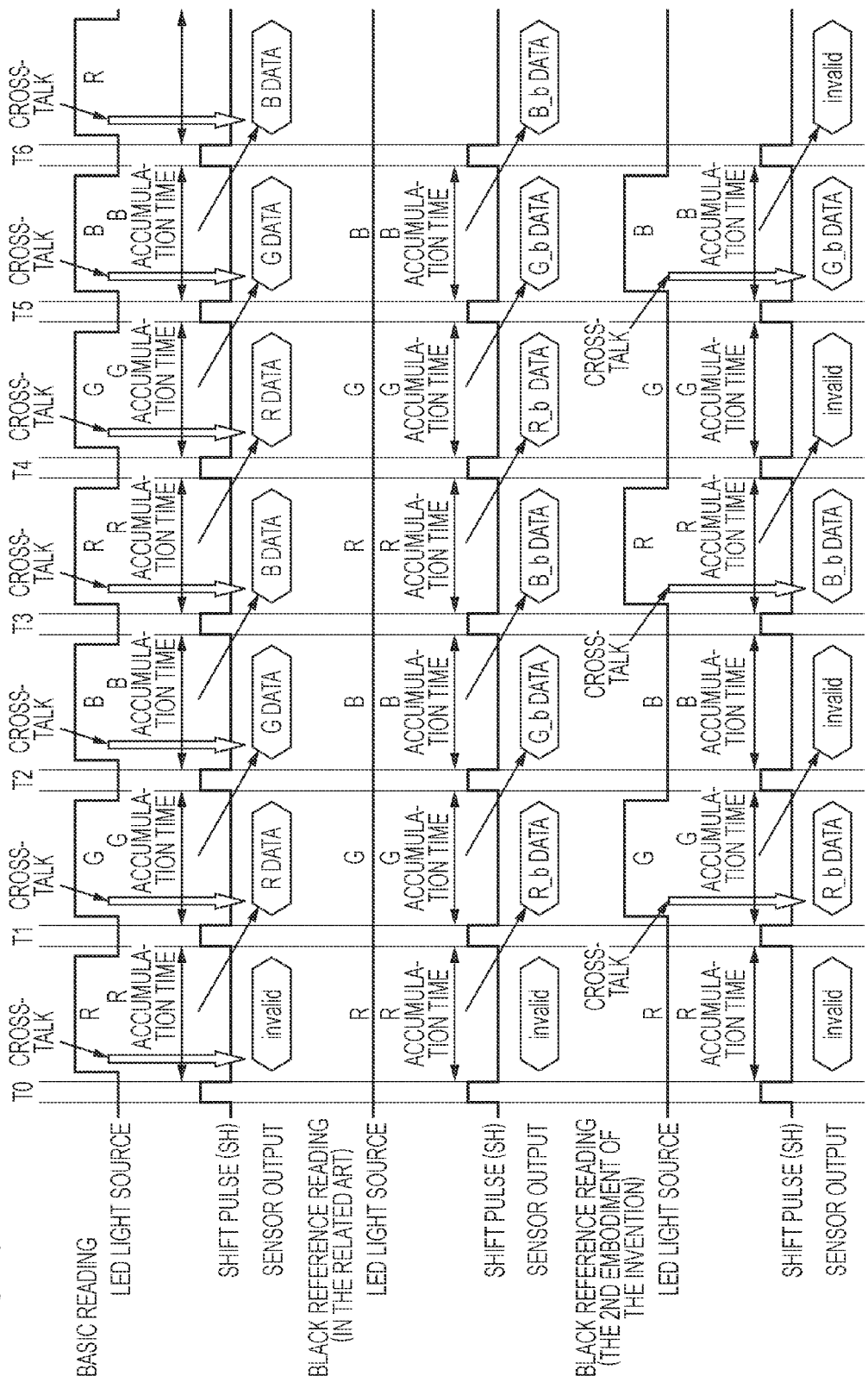
FIG. 3 is a timing chart illustrating an example of the reading control of the black reference data according to the second embodiment of the invention.

FIG. 3 is a timing chart illustrating an example of the black reference data reading control of the second embodiment. In addition, the lighting of the LED light source, the output of the shift pulse, and the timing of the sensor output are not intended to be limited to the illustrated intervals.

The control of the basic reading (reading of a normal document) and the reading control of black reference in the related art are as was described with reference to FIG. 2.

In this embodiment, in the reading of the black reference, the charge accumulated in the photoelectric conversion device is obtained with the lighting of the LED light source 210, and is used as black reference data. The following describes the black reference reading control of this embodiment.

When the reading control section 120 starts reading the black reference, it sequentially outputs the shift pulse which is the start timing of charge accumulation corresponding to red, green, and blue to the image sensor 220 (T0, T1, T2, T3, T4, T5, T6, . . . ). Each shift pulse indicates the timing of charge transfer to the shift register, which had been accumulated in the photoelectric conversion device by the shift pulse corresponding to the previous color.

In addition, when the reading control section 120 starts reading the black reference, it outputs the read-out clock to the image sensor 220 (not illustrated). The charge of each RGB color, which is transferred to the shift register according to each shift pulse, is sequentially output as an analog electric signal to the A/D converter section 110 by the read-out clock.

Now, the 1-line amount of data, which was transferred to the shift register at the timing of each shift pulse (T0, T2, T4, T6, ...) immediately after the lighting of the LED light source 210 for a predetermined period and then (interval of T0 to T1, T2 to T3, T4 to T5, T6 to T7, ...) was output to the A/D converter section 110, can be read and discarded as invalid data (invalid) by the data processing section 130. The A/D converter section 110 may be assigned so as to read and discard.

On the other hand, the 1-line amount of data, which is accumulated in the photoelectric conversion device in the state where the LED light source 210 is turned off, is transferred to the shift register at the timing of each shift pulse (T1, T3, T5, ...), and then (interval of T1 to T2, T3 to T4, T5 to T6, ...) is output to the A/D converter section 110, is obtained as the black reference data of red (R) (R_b data), the black reference data of green (G) (G_b data), and the black reference data of blue (B) (B_b data) by the data processing section 130.

In addition, according to the output timing (simultaneously with the timing or after a predetermined period has elapsed since the timing) of every second shift pulse (T1, T3, T5, ...), the reading control section 120 turns on the LED light source 210, continues lighting it for a predetermined period, and then turns it off.

In the illustrated example, according to the output timing (simultaneously with the timing or after a predetermined period has elapsed since the timing) of the shift pulse which is the start timing of charge accumulation corresponding to the green (G) (T1, T7, ...), the reading control section 120 turns on the green LED, continues lighting it for a predetermined period, and then turns it off. Similarly, according to the output timing (simultaneously with the timing or after a predetermined period has elapsed since the timing) of the shift pulse which is the start timing of charge accumulation corresponding to the red (R) (T3, T9, ...), the reading control section 120 turns on the red LED, continues lighting it for a predetermined period, and then turns it off. In the same way, according to the output timing (simultaneously with the timing or after a predetermined period has elapsed since the timing) of the shift pulse which is the start timing of charge accumulation corresponding to the blue (B) (T5, T11, ...), the reading control section 120 turns on the blue LED, continues lighting it for a predetermined period, and then turns it off.

The above is the reading control of the black reference in the second embodiment. According to this reading control of the black reference, when the charge accumulated in the photoelectric conversion device is transferred to the shift register and then is output from the shift register, the electric signal which reflects the influence of crosstalk due to the lighting of the LED light source 210 can be obtained as black reference data.

Moreover, in this embodiment, it is possible to obtain the variation in the output of each image reading device, not only based on the charge accumulated in the photoelectric conversion device in the state where the LED light source is turned off as in the related art, but also based on the charge carrying the crosstalk due to the lighting of the LED light source. Therefore, according to this embodiment, it is possible to obtain more accurate black reference data. As a result, the variation in the output due to the sensitivity and the crosstalk carried to the output of the image reading device can be effectively cancelled by shading correction, and the image quality can be improved.

In the above, the second embodiment of the invention has been described. According to this embodiment, it is possible to prevent degradation of the image quality due to crosstalk caused by lighting of the light source as much as possible.

The above embodiment of the invention is intended to describe the gist and the scope of the invention, but not to limit the invention. Many alternatives, modifications and variations of the example will be apparent to those skilled in the art.

What is claimed is:

1. An image reading apparatus which performs shading correction using black reference data, comprising:
    a light source configured to generate a red (R) color light, a green (G) color light and a blue (B) color light;
    an image sensor that transfers charge accumulated in a photoelectric conversion device to a shift register using shift pulses and outputs the charge transferred to the shift register as analog data;
    a reading control section that outputs a shift pulse which is a start timing of charge accumulation corresponding to each RGB color and controls a process of the light source generating a predetermined one of the R, G or B color light for a first predetermined period after a second predetermined period has elapsed since the output of the shift pulse; and
    a data processing section that does not obtain the data output from the image sensor as the black reference data according to the shift pulse and obtains the data output from the image sensor as the black reference data during a period that at least overlaps with the first predetermined period.

2. The image reading apparatus according to claim 1, wherein the the first, predetermined period is later than a period during which data is output from the image sensor according to the shift pulse.

3. An image reading apparatus which performs shading correction using black reference data, comprising:
    a light source configured to generate a red R color light, a green (G) color light and a blue (B) color light;
    an image sensor that transfers charge accumulated in a photoelectric conversion device to a shift register using shift pulses and outputs the charge transferred to the shift register as analog data;
    a reading control section that outputs a shift pulse which is start timing of charge accumulation corresponding to each RGB color and controls process of the light source generating a predetermined one of the R, G or B color light for a first predetermined period after a second predetermined period has elapsed since the output of every second shift pulse; and
    a data processing section that obtains data output from the image sensor as the black reference data according to the every other shift pulse and does not obtain data output from the image sensor as the black reference data according to any shift pulse between every other shift pulse.

4. The image reading apparatus according to claim 3, wherein the first predetermined period at least overlaps with a period during which data is output from the image sensor.

* * * * *